United States Patent [19]

Strader et al.

[11] Patent Number: 5,713,265
[45] Date of Patent: Feb. 3, 1998

[54] GREASE TRANSFER SYSTEM FOR GRILL RANGES

[75] Inventors: Michael A. Strader; Stephen Cunningham, both of Indianapolis; Joanne G. Stillman, Noblesville, all of Ind.; Michael E. Bales, Cleveland, Tenn.

[73] Assignee: Maytag Corporation, Newton, Iowa

[21] Appl. No.: 658,489

[22] Filed: Jun. 10, 1996

[51] Int. Cl.$^6$ .................................................. A47J 37/10
[52] U.S. Cl. ........................... 99/446; 99/400; 99/425; 126/51; 126/41 R
[58] Field of Search ........................... 99/444, 445, 446, 99/425, 400; 126/57, 47 R, 19 R, 273 R

[56] References Cited

U.S. PATENT DOCUMENTS

| | | |
|---|---|---|
| 2,345,480 | 3/1944 | Jones . |
| 2,691,369 | 10/1954 | Rutenber . |
| 2,766,683 | 10/1956 | Kanz . |
| 2,879,708 | 3/1959 | Cripe . |
| 3,098,477 | 7/1963 | Lotter . |
| 3,474,724 | 10/1969 | Jenn . |
| 3,756,140 | 9/1973 | Kolivas ........................... 99/446 X |
| 3,805,688 | 4/1974 | Gvozdjak ........................... 99/425 |
| 4,517,886 | 5/1985 | Bales ........................... 99/425 |
| 4,909,137 | 3/1990 | Brugnoli ........................... 99/446 X |

*Primary Examiner*—Reginald L. Alexander
*Attorney, Agent, or Firm*—Brinks Hofer Gilson & Lione

[57] ABSTRACT

A cooking appliance is provided comprising a grill unit having one or more heating units, a sump basin for collecting grease and other fluids used or generated during the cooking process, a drain opening disposed in the sump basin pan for allowing for the removal of fluid materials from within the basin, and a grease drain conduit extending from the drain opening of the sump basin to a grease receptacle. The grease drain conduit is disposed in sufficient heat-transfer relationship with the cooking unit to maintain the grease and other fluids traveling within the conduit in a flowing state to assist in the prevention of the grease coexisting and thereby obstructing the drain conduit.

21 Claims, 3 Drawing Sheets

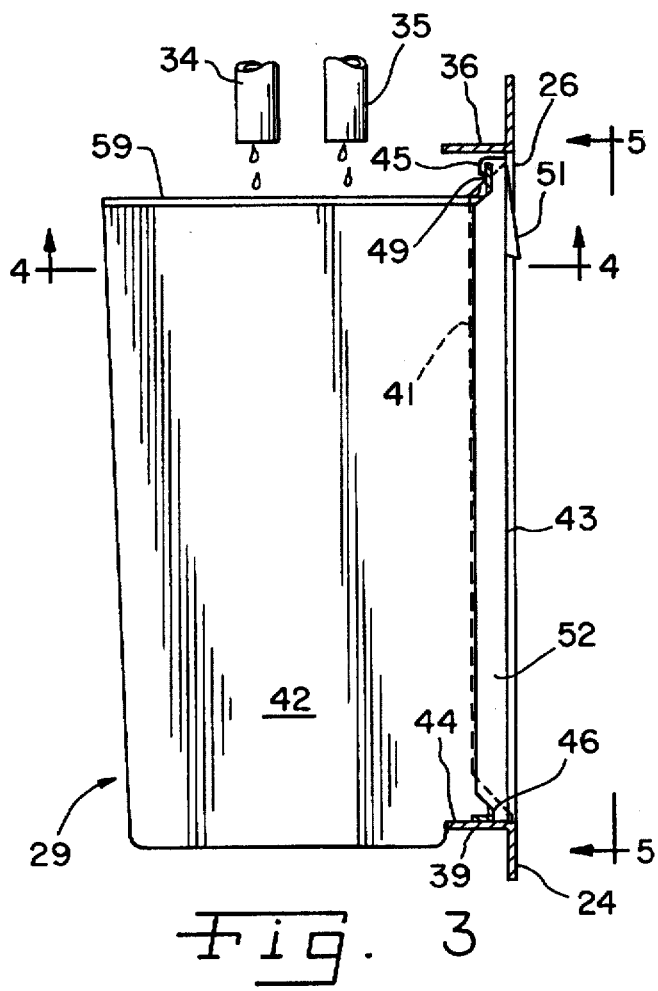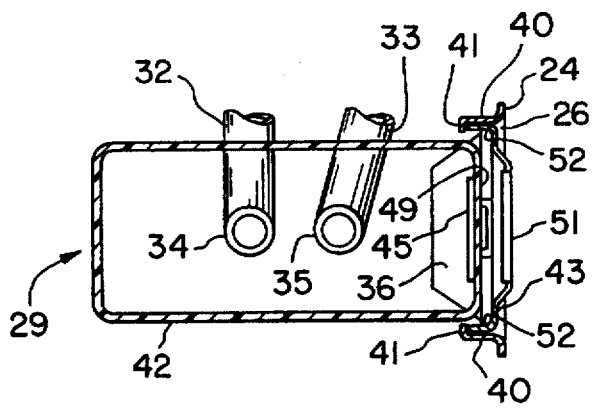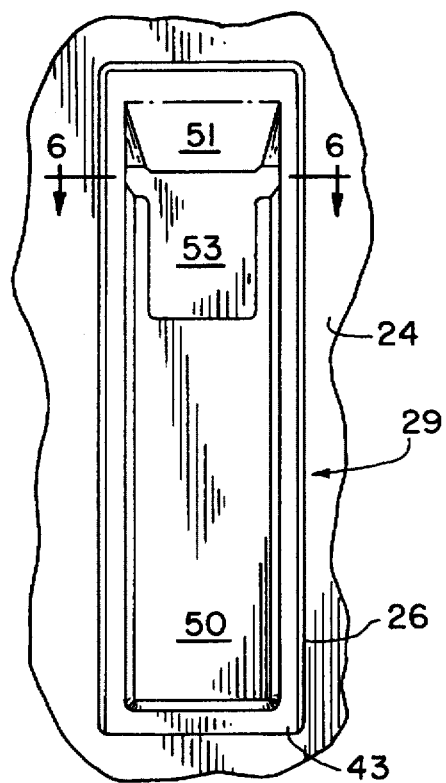

GREASE TRANSFER SYSTEM FOR GRILL RANGES

FIELD OF THE INVENTION

This invention relates to domestic cooking grill ranges and, more particularly, to an improved system for collecting the grease and other fluids used or generated during the cooking process, including an insulated or heated drain conduit to assist in the prevention of the coagulation of the grease within the drain conduit during its passage therethrough.

BACKGROUND OF THE INVENTION

The prior art has included a variety of countertop grilling units and various systems for collecting the grease from food that is broiled or grilled. One such prior ventilated countertop grilling unit is disclosed in U.S. Pat. No. 3,474,724 to Jenn.

Other systems disclose a cooking range having a top mounted grill and a grease collection system with a collection container concealed within the range. U.S. Pat. No. 4,517,886 to Bales is exemplary of such a system. Such prior systems often locate the grease receptacle or collection unit closer to the cooking surface in an effort to minimize the tendency of the hot grease cooling while it flows through the drain conduit and coagulating or congealing, which often results in the clogging of the grease drain conduit.

The structure of the cooking grill or aesthetic considerations often do not permit, however, the placement of the grease receptacle in such a convenient location near the cooking surface. Accordingly, there exists a need for a grease transfer system which permits the grease receptacle to be placed in a location distant from the cooking unit, while concurrently avoiding the tendency of the grease to coagulate and clog the drain conduit as the grease necessarily travels a longer distance through the drain conduit to the grease receptacle.

SUMMARY OF THE INVENTION

The immediate invention achieves the desired objectives in a grease transfer system comprising a grease drain conduit or downspout extending from the sump basin or drip pan of the countertop cooking unit, down along the interior side of the range or cabinet to a receptacle unit disposed adjacent the bottom of the range or cabinet. The grease drain conduit is attached to a drainage opening provided in the sump basin in such a manner that heat generated during the cooking process is transferred from the sump basin to the drain conduit. Such heat assists in preventing the grease from cooling and thus coagulating in the drain conduit, thereby clogging the drain conduit, as the grease flows to the receptacle unit.

In a further embodiment, the grease drain conduit can be thermally insulated to retain heat within the conduit to assist in the prevention of the grease coagulating.

An even further embodiment can comprise heat means coupled to the drain conduit to apply heat to the conduit. Such heat means can be coupled to the electrical and control system(s) of the range and selectively energized during certain cooking modes that produce cooking grease, such as when the grilling, broiling or griddle units are utilized. Increasing the heat content of the drain conduit will, as noted, assist in the prevention of the grease coagulating and possibly clogging the conduit.

A method of maintaining in a fluid state grease traveling through a drain conduit in a cooking appliance is further provided by this invention. Such a method comprises maintaining the grease above the temperature at which the grease congeals by retaining the heat already present within the conduit and preventing heat loss to the extent possible, by transferring heat generated during the cooking process from the sump basin underlying the cooking unit to the drain conduit, and/or by selectively applying heat directly to the drain conduit during certain cooking operations that generate grease, i.e., grilling or broiling.

Other objects, advantages and novel features of the invention will become apparent from the following detailed description of the invention when considered in conjunction with the accompanying drawings.

BRIEF DESCRIPTION OF THE DRAWINGS

The drawings illustrate preferred embodiments of the invention with various numerals referring to similar parts throughout the several views, wherein:

FIG. 3 is a fragmentary section view taken generally along lines 3—3 of FIG. 2;

FIG. 4 is a section view taken generally along lines 4—4 of FIG. 3;

FIG. 5 is a view of the grease receptacle or collection unit as normally mounted in the inner panel portion of the range.

BEST MODE FOR CARRYING OUT THE INVENTION

Figure 1:
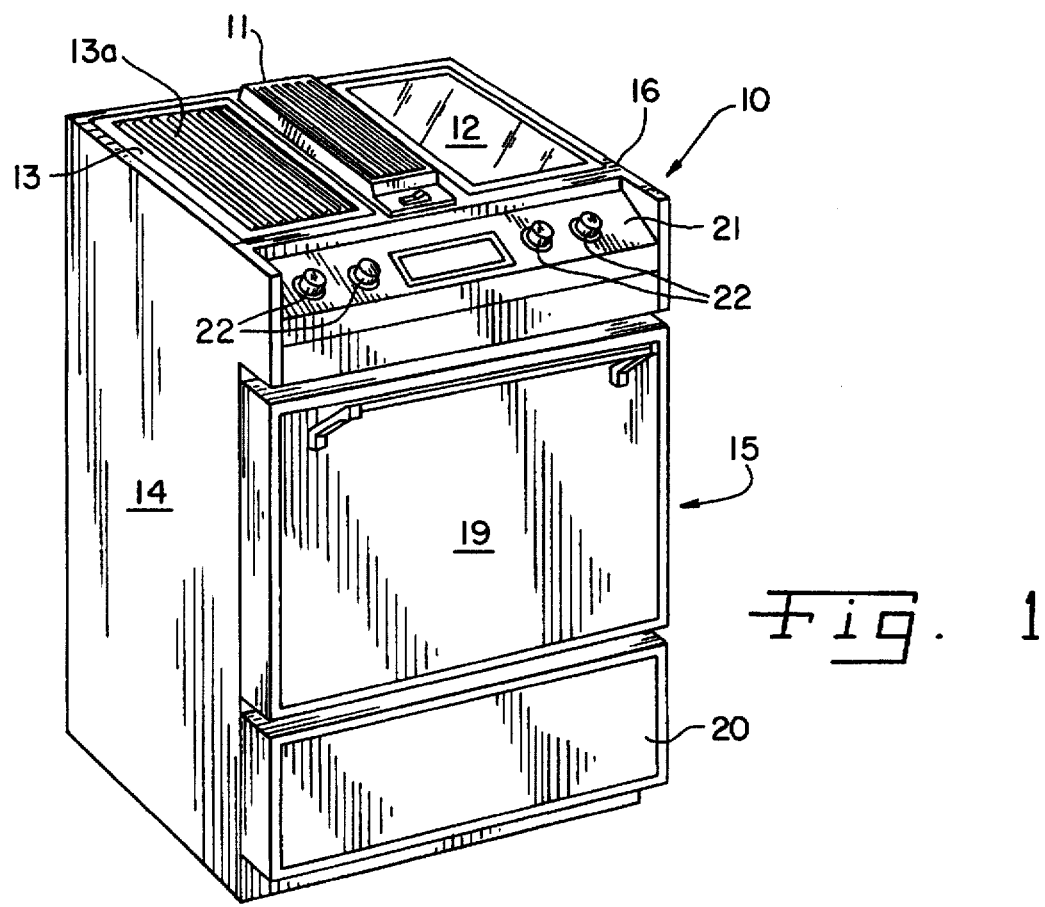
FIG. 1 is a pictorial view of a free-standing proximity ventilated range.
Figure 2:
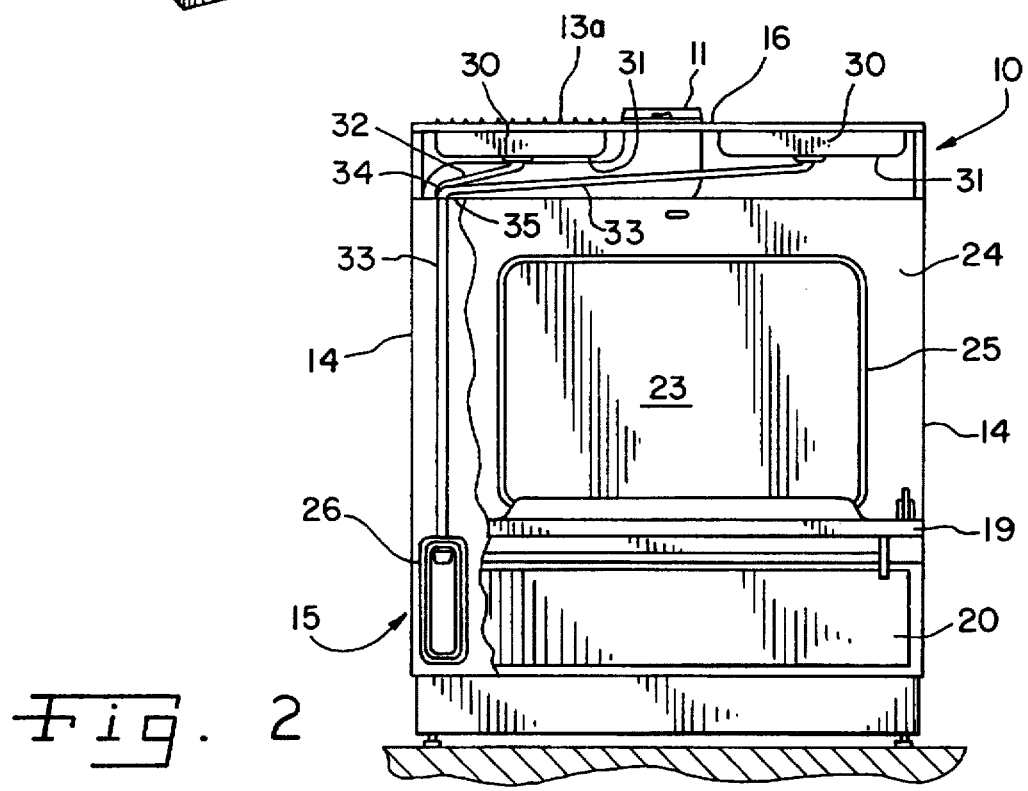
FIG. 2 is a front elevational view of the range of FIG. 1 with the control panel removed and the oven door open.

Referring now to the drawings and in particular to FIGS. 1 and 2, there is shown a free-standing range or stove 10 of the type incorporating proximity ventilation and equipped with a centrally located air intake 11. The interchangeable cooktop cartridges illustrated in FIG. 1 is a smooth cooktop unit 12 on the right and a grilling unit 13 on the left including a cooking grill or grid 13a upon which food items to be cooked are supported. While the range 10 shown in FIG. 1 utilizes interchangeable plug-in modular cooktop cartridges, such an embodiment is not essential as the grease transfer system of this invention can be employed in conjunction with a variety of other cooking accessories, as well as conventional heating elements, including broiling accessories. Moreover, the grease transfer system of this invention can also be employed in conjunction with a "drop-in" countertop grilling unit such as that shown in the aforementioned patent to Jenn (U.S. Pat. No. 3,474,724).

Heat for grilling or cooking is provided by one or more generally tubular electric heating elements (not shown) well known in the cooking appliance industry. Any number of individual heating elements may be used; however, for simplicity of wiring and possible replacement there conveniently would be one such heating element for each cooking section. The heating elements are typically formed into a serpentine shape and, in a grilling unit, are typically received through an opening 30a (FIG. 6) provided in sump basin 30. Appropriate conventional connections from the heating elements to the control circuit or power circuit of the cooking appliance are typically made at the rear of the unit and, for sake of simplicity, need not be shown here.

The range 10 as shown in FIGS. 1 and 2 includes a generally rectangular cabinet having substantially vertically disposed side and front panels 14 and 15 and a generally horizontally disposed top surface 16. The cabinet portion generally designated as front panel 15 is comprised of a forwardly opening oven door 19 and a forwardly opening access door 20, which is disposed directly below the oven door 19. Also, as shown in FIG. 1, a control panel 21 is generally associated with the front panel 15 and includes a plurality of control knobs 22 for providing individual control and operation of the cooktop cartridges 12 and 13 and of oven 23.

FIG. 2 shows the range 10 with the oven door 19 in the open position and with the control panel 21 removed for observation purposes. The inner panel portion 24 of the range 10, shown in FIG. 2, includes a pair of openings 25 and 26. A large generally centrally located opening defines the oven cavity opening 25 and a substantially smaller secondary opening 26 is disposed in the lower left-hand corner of the inner panel portion 24 for receiving a grease receptacle or collection unit 29, which is readily removable when the oven door 19 is open. Fluid collection unit 29 is positioned below the sump basins 30 for receiving and collecting grease and other fluid materials passing through the drain opening 36 of sump basins 30. When the oven door 19 is closed, the grease collector 29 is hidden from view.

In this specification, while the terminology grease is used most often, it is understood that such term is intended to include all other fluids produced, released or used in the cooking process.

As shown in FIG. 2, each of the cooktop cartridges 12 or 13 is supported on the top surface 16 overlying a pair of drip pans defined by sump basins 30 on each side of the proximity ventilation air intake 11. Each sump basin 30 is constructed so that the interior surface 31a of its bottom surface 31 slopes downwardly, preferably from the rear of the range 10 toward the front, so that any grease or other fluids generated by grilling food products or used in the cooking process, such as sauces, marinades, gravies, or the like, will drip downwardly into the sump basin 30 and naturally drain toward the lowest point of the basin (sump area 30b) where a drain opening 36 is preferably provided.

Figure 6:
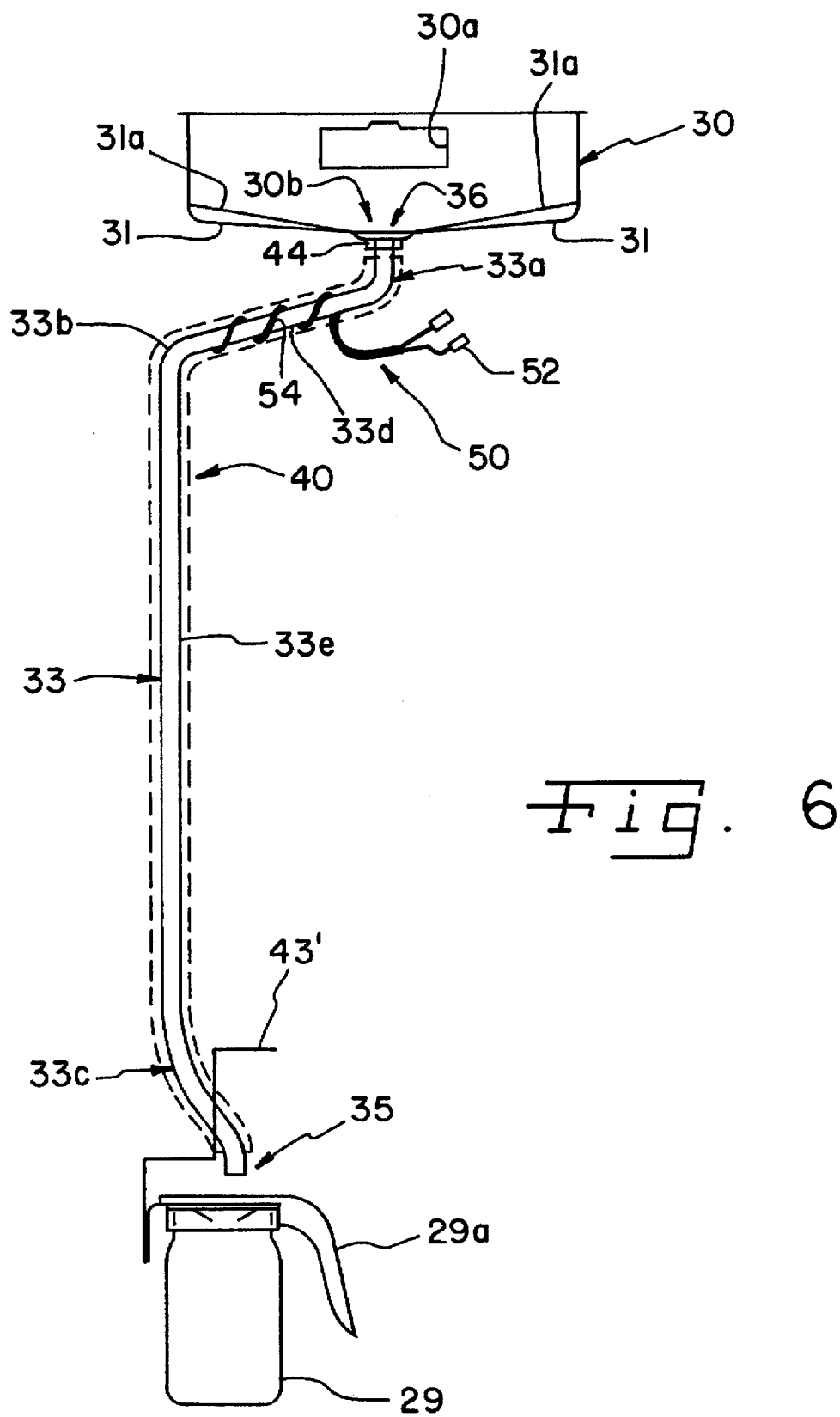
FIG. 6 is an enlarged front elevational view of the grease transfer system of this invention shown in isolation.

As further shown in FIGS. 2 and 6, a pair of drain conduits 32 and 33 (for clarity, only drain conduit 33 is shown in FIG. 6) can extend from the sump areas 30b of each basin 30 and have outlet ends 34 and 35 arranged in a secured position directly overlying the open top of the grease collector 29 as shown particularly in FIG. 4. Conduits 32 and 33 conduct grease and other fluids from the sump basins 30 to the fluid collection unit 29. If preferred, a drain conduit can be provided only in conjunction with the grilling unit in view of the fact that a grill unit is sometimes limited to lower power than a standard heating element. Consequently, a grill unit is sometimes limited to being inserted in only one of the cooking modules.

As best shown in FIGS. 3–5, the secondary opening 26 in the inner panel portion 24 of the range 10 is a vertically elongated rectangular opening spaced below the outlet ends 34 and 35 of the conduits 32 and 33. The top and bottom edges of the opening 26 are fabricated to provide a pair of rearwardly extending flanges 36 and 39. Each of the vertically disposed sides 40 of the rectangular opening 26 extend rearwardly for a predetermined distance and then turn in to form a pair of rearwardly spaced flanges 41. The vertically elongated rectangular opening 26 thus includes upper and lower flanges 36 and 39 and a rearwardly spaced generally narrower opening defined by the flanges 41.

As further shown in FIGS. 3–5, the open top substantially rectangular grease collector, or container, 29 is mounted within the rectangular opening 26 for receiving grease generated when grilling foods. The grease collector 29 can be of a two-piece construction including a thermoplastic grease container 42 and a stainless steel front panel 43 which is visibly compatible with the material of the inner panel portion 24.

The thermoplastic grease container 42 includes a step portion 44 at its lower front corner, as best shown in FIG. 3, which is engageable with and rests upon the lower flange 39 of the rectangular opening 26 when inserted therein. The stainless steel front panel 43 is secured to the front of the grease container 42 by upper and lower tabs 45 and 46 which are bent over the top and bottom edges of the front wall 49 of the grease container 42 as shown in FIG. 3. The center section 50 of the front panel 43 is rearwardly formed to engage with the front wall 49 of the grease container 42. As shown in FIGS. 4 and 5, the upper portion of the front panel 43 extends forwardly to define a finger hold handle 51 for aiding installation and removal of the grease collector 29 from the rectangular opening 26. Each side wall 52 of the front panel 43 is rearwardly formed and, as shown in FIG. 4, contacts the pair of rearwardly spaced flanges 41. Therefore the combination of lower flange 39 and rearwardly spaced flanges 41 maintains the grease collector 29 properly disposed within the rectangular opening 26.

As best shown in FIG. 5, the stainless steel front panel 43 is removed above the rearwardly formed center section 50 and below the handle 51 to define a window sight gauge area 53. The particular thermoplastic material used for the grease container 42 is naturally translucent and the level of grease will be readily visible through the window or sight gauge area 53.

As shown in FIG. 2, conduits 32 and 33 extend from the drip pans or sump basins 30 across the top of the range interior and downwardly at the side of the range interior and terminate at openings 34 and 35 positioned immediately above the grease receptacle 29. Such conduits can have an inside diameter on the order of about 3/16 to about 1/8 inch. Referring to FIG. 6, conduit 33, for example, is coupled to drain opening 36 of the bottom surface 31 of sump basin 30 and conducts a flow of grease from the sump area 30b of basin 30 to the grease receptacle 29. Based on the particular installation, conduit 33 may have several bends 33a–c and straight portions 33d and 33e, and can be supported by structural members 43' secured to the internal panel portions or walls of the range or cabinet. Support member 43' can further releasably carry grease receptacle 29.

During grilling operations, food items to be grilled are placed on the top surfaces of grill elements 13a, and the electric heating elements are energized to generate heat. A certain portion of the heat generated by the electric heating elements will tend to radiate downwardly. The heat reflecting drip pan or sump basin 30 reflects a portion of this heat back upwardly toward the grill with the generally dished shape configuration of the sump basin assisting in this action by reflecting the heat upwardly and inwardly. Melted fat or grease from the food being cooked will drip from the food and grill elements 13a and drop downwardly into the sump basin 30. The fluid grease and any other foreign matter carried thereby will flow down the inclined surfaces of interior bottom surfaces 31a of sump basin 30 into the sump area 30b and through the drain opening 36 into drain conduits 32 and 33. As mentioned above, because of the length of the conduits 32 and 33, leading preferably to a point adjacent the base of the range or cabinet, the grease can cool sufficiently that it loses its fluidity and coagulates while still in the conduit, forming an obstruction in the conduit.

Once an obstruction begins to form in the conduit, it becomes more difficult for grease to flow therethrough, and since, as a result, the grease will spend more time in the conduit, the grease is more likely to cool and congeal in the conduit, thereby simply adding to the obstruction. Eventually, the obstruction can completely block the conduit.

An object of this invention is to minimize the tendency of the hot grease and other fluids to cool while traveling through the drain conduits to prevent their coagulating or congealing. To this end, the invention can further comprise means and methods for maintaining the grease and other materials in a fluid state within the drain conduits.

Such means can take multiple embodiments. One such embodiment can include means for retaining the heat within the drain conduit to prevent heat loss. As shown in FIG. 6, one such heat-retaining means can include thermal insulation 40 (shown in phantom lines) provided partially or entirely about conduit 33.

A further embodiment of means for maintaining the grease in a fluid state within the conduit can include means for transferring heat generated during the cooking process from the sump basin 30 to the drain conduit 33. Such heat-transferring means can comprise a connecting member 44 shown in FIG. 6 coupling the upper end of drain conduit 33 with the drain opening 36 of sump basin 30. Connecting member 44 is preferably constructed of a high-conductive metallic material, such as aluminum, which readily conducts the heat generated during the cooking process and contained in the material from which sump basin 30 is constructed to the drain conduit 33. Sump basin 30 is preferably constructed of porcelain steel. Drain conduits 32 and 33 are also preferably constructed of a high-conductive metallic material such as aluminum.

An even further embodiment of means for maintaining the grease and other materials in a fluid state within the drain conduit can include means for applying heat directly to the drain conduit. As shown in FIG. 6, such means can be defined by an heating element 50 coupled to drain conduit 33 and to an electrical power supply, via conventional connectors 52, and to the control means for the grilling unit, also in a conventional manner, such that the conduit heating means is energized during selected cooking operations, i.e., grilling or broiling. Heating element 50 includes a resistive wire 54 wrapped about conduit 32 to impart heat directly thereto via resistive heating upon the heating element 50 being energized.

This invention further provides a method for maintaining in a fluid or flowing state the grease and other fluids traveling within a grease drain conduit of a cooking appliance comprising the steps of providing a cooking grill 13a for supporting food items to be cooked; providing at least one heating element arranged below or above cooking grill 13a for generating heat for cooking; providing a sump basin 30 arranged below cooking grill 13a for catching grease and other fluids used or generated during the cooking process; providing at least one drain opening 36 formed in the sump basin 30 for permitting the passage of grease and other fluids therethrough; positioning a fluid collection unit 29 below sump basin 30 for receiving and collecting grease and other fluids; conducting grease and other fluid materials from sump basin 30 to fluid collection unit 29 by a conduit 32 or 33 extending therebetween; and maintaining the temperature of the grease and other fluids within conduit 32 at a point above that which the grease and other fluids begin to congeal.

Maintaining the grease in a fluid state within the conduit can include retaining the heat within the drain conduit. Such heat-loss prevention can be carried out by disposing thermal insulation 40 at least partially about drain conduit 33 as shown in FIG. 6.

Maintaining the grease in a fluid state can alternatively be carried out by transferring heat generated during the cooking process to the drain conduit 33. One such means includes coupling the upper end of conduit 33 to the drain opening 36 of sump basin 30 via thermally conductive connecting member 44.

Maintaining a fluid state within the conduit can even further be achieved by selectively applying heat to the drain conduit via heating element 50 shown in FIG. 6. Element 50 can be coupled to the electrical power supply and control means for the cooking unit such that the heating element 50 is selectively energized during grease-generating cooking operations.

When the oven door of the range is closed, the grease transfer system of this invention is completely hidden from view. When the oven door is open, the rectangular front panel of receptacle 29 is visible and includes a window for determining at a glance whether or not the grease collector 29 needs to be emptied. There is thus provided a grease transfer and collection system that is aesthetically pleasing, easily cleaned and serviced, has a window for readily determining the grease level, provides for controlled overflow and minimal clogging of the drain conduit(s), and includes a grease receptacle having a built-in handle 29a.

Although the invention has been described with preferred embodiments, those skilled in the art will understand that modifications and variations may be made without departing from the scope of this invention as set forth in the following claims. Such modifications and variations are considered to be within the purview and scope of the appended claims.

We claim:

1. A cooking appliance, comprising:

a grill unit having one or more heating units;

a drip pan for collecting grease and other fluid materials used or generated during the cooking process;

a drain opening disposed in said drip pan for allowing for the removal of fluid materials from within said drip pan;

a conduit connected with the drain opening of said drip pan and extending therefrom to a grease receptacle; and a heater coupled to said conduit for applying heat thereto, said heater being operable to transfer sufficient heat to said conduit to maintain the grease and other fluid materials within said conduit in a flowing state.

2. The cooking appliance of claim 1 further comprising a heat transferring connection coupling said conduit with said grill unit.

3. The cooking appliance of claim 2 wherein said heat transferring connection comprises the connection coupling an upper end of said conduit with said drip pan.

4. The cooking appliance of claim 1 further comprising thermal insulation disposed about, at least in part, said conduit.

5. The cooking appliance of claim 1 wherein said heater comprises a heating element attached to said conduit and electrically connected to a control for said grill unit, said heating element being energized during grease-generating cooking operations.

6. In a cooking appliance including a cooking unit having one or more heating elements, a cooking grid arranged above or below the heating elements for supporting food items to be cooked, a sump pan arranged below the cooking grid for collecting grease and other fluid materials used or generated during the cooking process, said sump pan having a drain opening formed therein for the passage of fluid grease and other fluid materials from the sump pan, and a drain conduit extending from said drain opening to a receptacle unit, the improvement comprising a grease transfer system including means defined by a conduit heater for maintaining the grease and other fluid materials in a fluid state within said conduit.

7. The improved grease transfer system of claim 6 further comprising a heat transferring connecting member coupling said drain conduit to said sump pan, said connecting member transferring heat from the cooking unit to said drain conduit.

8. The improved grease transfer system of claim 6 further comprising thermal insulation surrounding, at least in part, said drain conduit.

9. The improved grease transfer system of claim 6 wherein said conduit heater comprises a heating element coupled to said drain conduit, said heating element further being electrically connected to a control for the heating elements and being energized during selected grease-generating cooking operation.

10. A cooking unit, comprising:
 a cooking grill for supporting food items to be cooked;
 at least one heating element arranged below or above said cooking grill for generating heat for cooking;
 a sump basin arranged below said cooking grill for catching grease and other fluids used or generated during the cooking process, said sump basin having at least one drain opening formed therein for the passage of grease and other fluids;
 a fluid collection unit positioned below said sump basin for receiving and collecting grease and other fluids passing through the drain opening of said sump basin, said fluid collection unit having an open top and being removable for cleaning or replacement;
 a drain conduit extending from the drain opening of said sump basin to a location closely above the open top of said fluid collection unit for conducting grease and other fluid materials from said sump basin to said fluid collection unit; and
 heating means for maintaining the grease and other fluids in a fluid state while traveling within said drain conduit.

11. The cooking unit as in claim 10 wherein said heating means for maintaining the grease and other fluids in a fluid state within said conduit comprises thermal insulation disposed at least partially about said drain conduit for preventing heat loss from said drain conduit.

12. The cooking unit as in claim 10 further comprising means for transferring heat generated during the cooking process to said drain conduit, said heat-transferring means including a highly heat-conductive metallic member connecting said conduit to said sump pan.

13. The cooking unit as in claim 10 wherein said heating means for maintaining the grease and other materials in a fluid state within said conduit comprises a heater coupled to said drain conduit; for applying heat thereto.

14. The cooking unit as in claim 13 wherein said heating means is coupled to an electrical power supply and a control means for said cooking unit such that said heating means is selectively energized during grease generating cooking operations.

15. A method for maintaining in a flowing state grease and other fluids traveling within a grease drain conduit employed in a grease transfer system of a cooking appliance, said method comprising the steps of:
 providing a sump basin disposed below a cooking grill for catching grease and other fluids used or generated during the cooking process;
 providing at least one drain opening in the sump basin for the passage of grease and other fluids;
 positioning a fluid collection unit below said sump basin for receiving and collecting grease and other fluids;
 conducting grease and other fluid materials from said sump basin to said fluid collection unit by way of a conduit extending therebetween; and
 maintaining the temperature of the grease and other fluids within said conduit at a level above that temperature at which the grease congeals by disposing thermal insulation at least partially about said conduit.

16. The method as in claim 15 wherein said temperature-maintaining step further comprises the step of transferring heat generated during the cooking process to said conduit.

17. The method as in claim 16 wherein said heat-transferring step includes coupling said conduit to the sump basin by a thermally conductive member.

18. A cooking appliance, comprising:
 a grill unit having one or more heating units;
 a drip pan for collecting grease and other fluid materials used or generated during the cooking process;
 a drain opening disposed in said drip pan for allowing for the removal of fluid materials from within said drip pan;
 a conduit connected with the drain opening of said drip pan and extending therefrom to a grease receptacle; and
 thermal insulation disposed about, at least in part, said conduit,
 said conduit retaining heat generated during the cooking process sufficient to maintain the grease and other fluid materials within said conduit in a flowing state.

19. In a cooking appliance including a cooking unit having one or more heating elements, a cooking grid arranged above or below the heating elements for supporting food items to be cooked, a sump pan arranged below the cooking grid for collecting grease and other fluid materials used or generated during the cooking process, said sump pan having a drain opening formed therein for the passage of fluid grease and other fluid materials from the sump pan, and a drain conduit extending from said drain opening to a receptacle unit, the improvement comprising a grease transfer system including heat-retaining means for maintaining the grease and other fluid materials in a fluid state within said conduit, said heat-retaining means comprising thermal insulation surrounding, at least in part, said drain conduit.

20. A cooking unit, comprising:
 a cooking grill for supporting food items to be cooked;
 at least one heating element arranged below or above said cooking grill for generating heat for cooking;
 a sump basin arranged below said cooking grill for catching grease and other fluids used or generated during the cooking process, said sump basin having at least one drain opening formed therein for the passage of grease and other fluids;
 a fluid collection unit positioned below said sump basin for receiving and collecting grease and other fluids passing through the drain opening of said sump basin, said fluid collection unit having an open top and being removable for cleaning or replacement;

a drain conduit extending from the drain opening of said sump basin to a location closely above the open top of said fluid collection unit for conducting grease and other fluid materials from said sump basin to said fluid collection unit; and means defined by thermal insulation disposed at least partially about said drain conduit for preventing heat loss therefrom sufficient to maintain the grease and other fluids in a fluid state while traveling within said drain conduit.

21. A method for maintaining in a flowing state grease and other fluids traveling within a grease drain conduit employed in a grease transfer system of a cooking appliance, said method comprising the steps of:

providing a sump basin disposed below a cooking grill for catching grease and other fluids used or generated during the cooking process;

providing at least one drain opening in the sump basin for the passage of grease and other fluids;

positioning a fluid collection unit below said sump basin for receiving and collecting grease and other fluids;

conducting grease and other fluid materials from said sump basin to said fluid collection unit by way of a conduit extending therebetween; and maintaining the temperature of the grease and other fluids within said conduit at a level above that temperature at which the grease congeals by applying heat to said conduit by way of a heater operatively coupled to said conduit, said heater being selectively energized during grease-generating cooking operations.

* * * * *